(12) United States Patent
Ahn

(10) Patent No.: US 11,358,577 B2
(45) Date of Patent: Jun. 14, 2022

(54) HYDRAULIC BLOCK OF ELECTRONIC BRAKING DEVICE FOR VEHICLE AND ELECTRONIC BRAKING DEVICE FOR VEHICLE HAVING THE SAME

(71) Applicant: HYUNDAI MOBIS Co., Ltd., Seoul (KR)

(72) Inventor: Sung Ki Ahn, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 242 days.

(21) Appl. No.: 16/719,799

(22) Filed: Dec. 18, 2019

(65) Prior Publication Data

US 2020/0216053 A1 Jul. 9, 2020

(30) Foreign Application Priority Data

Jan. 3, 2019 (KR) .......................... 10-2019-0000593

(51) Int. Cl.
| | |
|---|---|
| *B60T 13/68* | (2006.01) |
| *B60T 17/02* | (2006.01) |
| *B60T 13/16* | (2006.01) |
| *B60T 13/58* | (2006.01) |
| *F15B 13/08* | (2006.01) |
| *B60T 17/00* | (2006.01) |
| *B60T 8/36* | (2006.01) |

(52) U.S. Cl.
CPC ............ *B60T 13/686* (2013.01); *B60T 8/368* (2013.01); *B60T 13/167* (2013.01); *B60T 13/58* (2013.01); *B60T 17/00* (2013.01); *F15B 13/0832* (2013.01); *B60T 17/02* (2013.01); *B60T 2270/402* (2013.01); *B60T 2270/413* (2013.01)

(58) Field of Classification Search
CPC .... B60T 8/3675; B60T 8/3685; B60T 13/686; B60T 13/662; B60T 13/745; B60T 17/02; B60T 17/04
USPC .................................................. 303/DIG. 10
See application file for complete search history.

(56) References Cited

U.S. PATENT DOCUMENTS

| | | | |
|---|---|---|---|
| 7,997,665 B2 * | 8/2011 | Nakazawa | B60T 8/409 |
| | | | 303/119.3 |
| 10,179,575 B2 | 1/2019 | Shin et al. | |
| 11,001,245 B2 | 5/2021 | Dinkel | |
| 2008/0230337 A1 | 9/2008 | Kajiyama et al. | |

(Continued)

FOREIGN PATENT DOCUMENTS

| | | |
|---|---|---|
| CN | 101269658 | 9/2008 |
| DE | 102006033493 | 2/2007 |
| DE | 102016203119 | 8/2017 |

(Continued)

*Primary Examiner* — Thomas J Williams
(74) *Attorney, Agent, or Firm* — H.C. Park & Associates, PLC

(57) ABSTRACT

A hydraulic block of an electronic braking device for a vehicle may include: a block body including a controller mounting part to which an electronic control unit (ECU) is coupled and a motor mounting part to which a motor is coupled; an input port part disposed closer to the controller mounting part between the controller mounting part and the motor mounting part; an output port part disposed closer to the motor mounting part between the controller mounting part and the motor mounting part; and a hydraulic circuit part formed in the block body so as to extend from the input port part to the output port part, and housing a valve controlled by the ECU.

12 Claims, 4 Drawing Sheets

(56) References Cited

U.S. PATENT DOCUMENTS

2015/0166028 A1\* 6/2015 Kim .................. B60T 13/662
                                                                           303/10
2020/0216053 A1\* 7/2020 Ahn .................. B60T 13/167

FOREIGN PATENT DOCUMENTS

| DE | 102017211807 A1 \* | 1/2019 | .............. B60T 13/66 |
| JP | 2005138643 A \* | 6/2005 | ............ B60T 8/3685 |
| JP | 2011-051359 | 3/2011 | |
| KR | 10-2016-0112258 | 9/2016 | |
| WO | WO-2017144201 A1 \* | 8/2017 | ............ B60T 13/161 |

\* cited by examiner

HYDRAULIC BLOCK OF ELECTRONIC BRAKING DEVICE FOR VEHICLE AND ELECTRONIC BRAKING DEVICE FOR VEHICLE HAVING THE SAME

CROSS-REFERENCES TO RELATED APPLICATIONS

This application claims priority from and the benefit of Korean Patent Application No. 10-2019-0000593, filed on Jan. 3, 2019, which is hereby incorporated by reference for all purposes as if fully set forth herein.

BACKGROUND

Field

Exemplary embodiments relate to a hydraulic block of an electronic braking device for a vehicle and an electronic braking device for a vehicle having the same, and more particularly, to a hydraulic block of an electronic braking device for braking a vehicle using hydraulic pressure, and an electronic braking device having the same.

Discussion of the Background

In general, an electronic brake system refers to a system for efficiently preventing a slip which may occur during braking, sudden unintended acceleration or rapid acceleration of a vehicle. Typically, the electronic brake system includes a hydraulic unit for adjusting braking hydraulic pressure and an electronic control unit (ECU) for controlling the hydraulic unit, in addition to a brake booster, a master cylinder and a wheel cylinder of a brake system for a vehicle.

The hydraulic unit includes a plurality of solenoid valves for controlling braking hydraulic pressure transferred to wheel cylinders installed at respective wheels, a low-pressure accumulator for temporarily accumulating oil which comes out of the wheel cylinder, a pump driven by a motor, and a shuttle valve and a driving force control valve which are installed at a suction part and a discharge part of the pump, respectively. The parts are mounted in a hydraulic block made of aluminum.

The related art of the present invention is disclosed in Korean Patent Publication No. 2016-0112258 published on Sep. 28, 2016 and entitled "Electronic brake system using integrated sensor and operating method thereof".

Recently, much research is conducted to develop fully autonomous vehicles. Thus, various attempts are made to reinforce the operation stability of electronic brake systems. However, since the conventional electronic brake system has no device capable of replacing an electronic brake part in case of a breakdown of the electronic brake part, the conventional electronic brake system has a limitation in securing the stability of autonomous driving.

Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to a hydraulic block of an electronic braking device, which can be applied as an auxiliary braking device capable of performing a braking function in place of a main braking device in case of a breakdown of the main braking device, and installed with the main braking device efficiently in terms of space, and an electronic braking device having the same.

In one embodiment, a hydraulic block of an electronic braking device for a vehicle may include: a block body including a controller mounting part to which an electronic control unit (ECU) is coupled and a motor mounting part to which a motor is coupled; an input port part disposed closer to the controller mounting part between the controller mounting part and the motor mounting part; an output port part disposed closer to the motor mounting part between the controller mounting part and the motor mounting part; and a hydraulic circuit part formed in the block body so as to extend from the input port part to the output port part, and housing a valve mounted in the ECU.

The input port part may be connected to an output line of a main braking device, and disposed closer to the output line of the main braking device than the output port part, and the output port part may be connected to a hydraulic brake line for individually adjusting a wheel.

The motor mounting part and the controller mounting part may be disposed on a front surface and a rear surface of the block body, and the input port part may be disposed on a top surface of the block body, which has a smaller area than the front and rear surfaces of the block body.

The input port part include a plurality of input ports may be arranged on the top surface of the block body while forming a first line, and the output port part include a plurality of output ports may be arranged on the top surface of the block body in parallel to the input port part, while forming a second line.

The input port part may include: a main braking port connected to an output line of a main braking device; and a master cylinder port connected to an output line of a master cylinder, and disposed between the main braking port and the main braking port.

The hydraulic circuit part may include: a first chamber connected to the input port part, and housing a first valve inserted through the controller mounting part; a chamber connection flow path extended downward from the first chamber; a second chamber connected to the chamber connection flow path, and housing a second valve inserted through the controller mounting part; and an extended flow path extended upward from the second chamber to the output port part.

The first chamber may include: a first input chamber connected to the bottom of the input port part so as to communicate with the input port part, such that fluid is introduced into the first valve; and a first output chamber connected to the first input chamber to switch a flow direction of the fluid to a lateral direction.

The second chamber may include: a second input chamber connected to the bottom of the chamber connection flow path so as to be extended in a lateral direction, such that fluid is introduced into the second valve; and a second output chamber connected to the second input chamber to switch a flow direction of the fluid to a downward direction.

In another embodiment, an electronic braking device for a vehicle may include: a main braking device configured to brake a vehicle using hydraulic pressure; and an auxiliary braking device installed for redundancy of vehicle braking, and including a hydraulic block having one side connected to an output line of the main braking device and the other side connected to a hydraulic brake line for individually adjusting a wheel.

The hydraulic block may include: a block body including a controller mounting part to which an ECU is coupled and a motor mounting part to which a motor is coupled; an input port part disposed closer to the controller mounting part between the controller mounting part and the motor mounting part, and connected to the output line of the main braking device; an output port part disposed closer to the motor mounting part between the controller mounting part and the motor mounting part, and connected to the hydraulic brake line; and a hydraulic circuit part formed in the block body so as to extend from the input port part to the output port part.

The input port part may be disposed closer to the output line of the main braking device than the output port part.

The motor mounting part and the controller mounting part may be disposed on a front surface and a rear surface of the block body, and the input port part may be disposed on a top surface of the block body, which has a smaller area than the front and rear surfaces of the block body.

The input port part include a plurality of input ports may be arranged on the top surface of the block body while forming a first line, and the output port part include a plurality of output ports may be arranged on the top surface of the block body in parallel to the input port part, while forming a second line.

The input port part may include: a main braking port connected to the output line of the main braking device; and a master cylinder port connected to an output line of a master cylinder, and disposed between the main braking port and the main braking port.

The hydraulic circuit part may include: a first chamber connected to the input port part, and housing a first valve inserted through the controller mounting part; a chamber connection flow path extended downward from the first chamber; a second chamber connected to the chamber connection flow path, and housing a second valve inserted through the controller mounting part; and an extended flow path extended upward from the second chamber to the output port part.

In the hydraulic block of the electronic braking device for a vehicle and the electronic braking device for a vehicle having the same in accordance with the embodiment of the present invention, the input port part may be formed at the controller mounting part, and the output port part may be formed at the motor mounting part. Thus, when the hydraulic block is applied as the auxiliary braking device capable of performing a braking function in place of the main braking device in case of a breakdown of the main braking device, the auxiliary braking device and the main braking device may be installed efficiently in terms of space.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
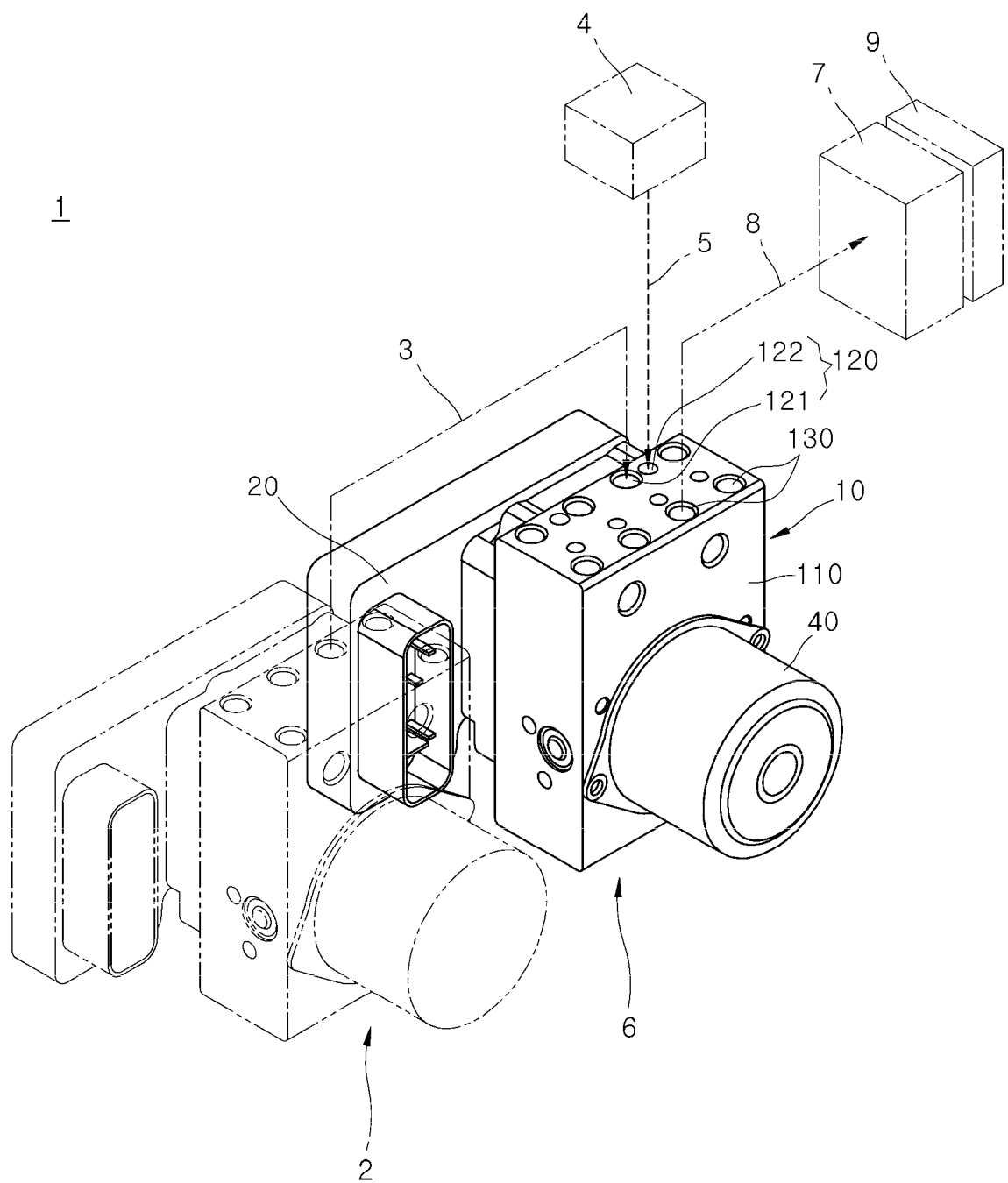
FIG. 1 is a perspective view schematically illustrating a hydraulic block of an electronic braking device for a vehicle and an electronic braking device for a vehicle having the same in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a hydraulic block of an electronic braking device and an electronic braking device having the same in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a perspective view schematically illustrating a hydraulic block of an electronic braking device for a vehicle and an electronic braking device for a vehicle having the same in accordance with an embodiment of the present invention.

Referring to FIG. 1, the electronic braking device 1 in accordance with the embodiment of the present invention may include a main braking device 2 and an auxiliary braking device 6.

The main braking device 2 may serve to mainly implement a function of braking a vehicle in a normal state. The main braking device 2 may receive fluid from a master cylinder 4, control the received fluid to preset hydraulic pressure, and transfer the controlled fluid to a conventional brake system (CBS) 7 for individually adjusting a wheel 9. That is, the main braking device 2 may correspond to an electronic braking device such as an anti-lock brake system (ABS), an electronic brake force distribution system (EBD) or an electronic stability control (ESC) device.

The auxiliary braking device 6 may be installed for redundancy of vehicle braking, and have a structure capable of performing in place of the main braking device 2, a braking function which has been performed by the main braking device 2, in case of a breakdown of the main braking device 2. The auxiliary braking device 6 may be disposed at the downstream side of the main braking device 2. In other words, the auxiliary braking device 6 may be disposed on a path through which fluid is transferred from the main braking device 2 to the CBS 7. In case of a breakdown of the main braking device 2, the auxiliary braking device 6 may receive the fluid supplied to the main braking device 2, control the received fluid to target pressure, and transfer the controlled fluid to the CBS 7.

In the present embodiment, a fluid supply line through which fluid having passed through the main braking device 2 is supplied to the auxiliary braking device 6 may be referred to as an output line 3 of the main braking device 2 as indicated by an alternated long and short dash line in FIG. 1, and a fluid supply line through which fluid having passed through the auxiliary braking device 6 is transferred to the CBS 7 for individually adjusting the wheel 9 may be referred to as a hydraulic brake line 8 as indicated by an alternate long and two short dashes line in FIG. 1. That is, the auxiliary braking device 6 may be disposed between the output line 3 of the main braking device 2 and the hydraulic brake line 8.

The auxiliary braking device 6 in accordance with the embodiment of the present invention may include a hydraulic block 10, an electronic control unit (ECU) 20, a valve 30 and a motor 40.

The hydraulic block 10 may function as a pump housing, and include an input port part 120 connected to the output line 3 of the main braking device 2, an output port part 130 connected to the hydraulic brake line 8 for individually adjusting the wheel 9, and a hydraulic circuit part 140 for controlling the hydraulic pressure of fluid therein.

The ECU 20 for electronically controlling fluid passing through the hydraulic block 10 may be coupled to the rear surface 116 of the hydraulic block 10. The ECU 20 may have a plurality of valves 30 for adjusting the hydraulic pressure and flow rate of fluid passing through the hydraulic block 10. The ECU 20 may control operations of the valves 30.

The motor 40, which serves to forcibly move the fluid of the hydraulic block 10 in a preset direction, may be coupled to the front surface 115 of the hydraulic block 10. Since the ECU 20 and the motor 40 have structures disclosed in an existing electronic braking device or the main braking device 2, the detailed descriptions of the ECU 20 and the motor 40 will be omitted herein.

Figure 2:
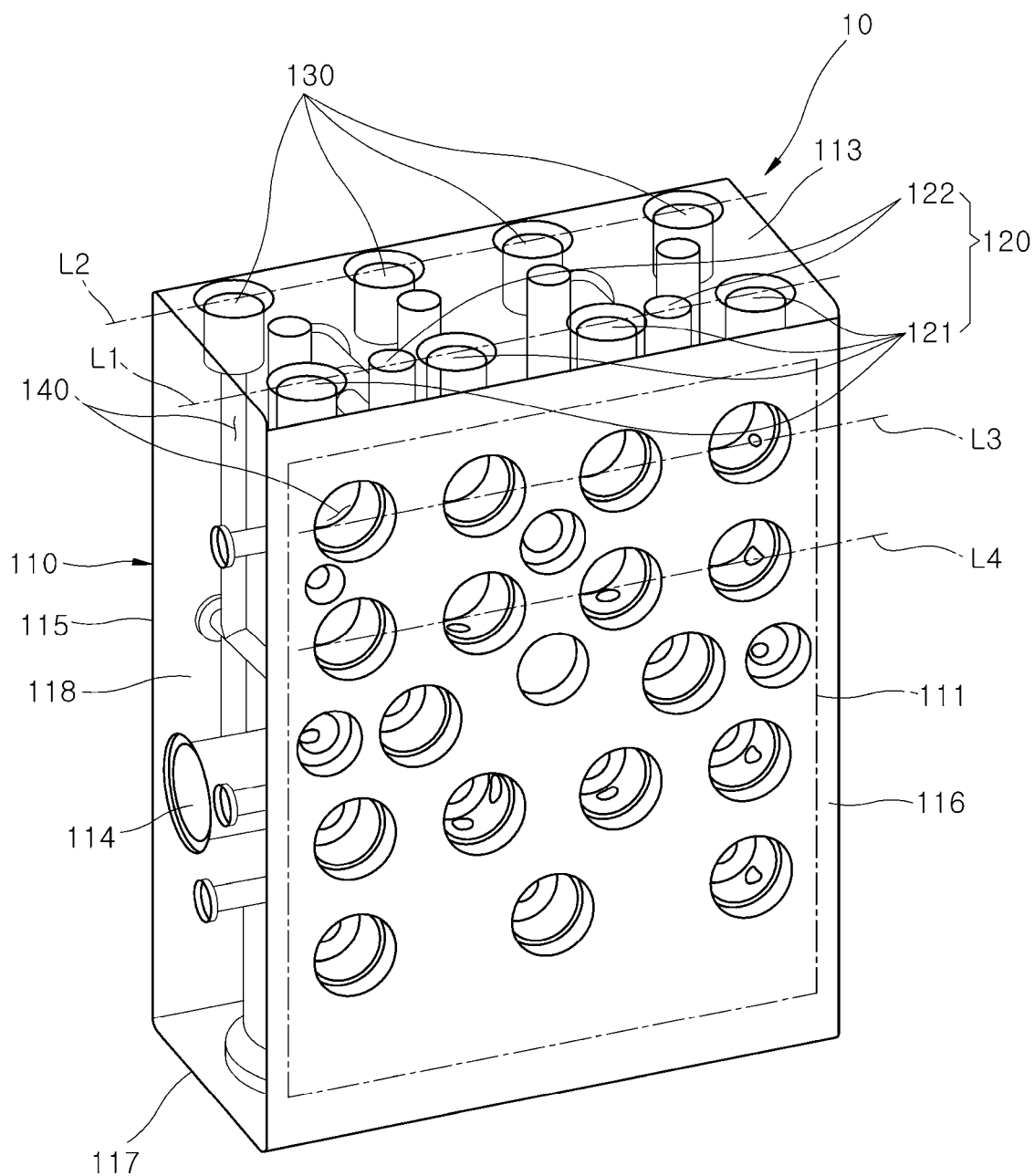
FIG. 2 is a perspective view schematically illustrating the hydraulic block of the electronic braking device for a vehicle in accordance with the embodiment of the present invention.
Figure 3:
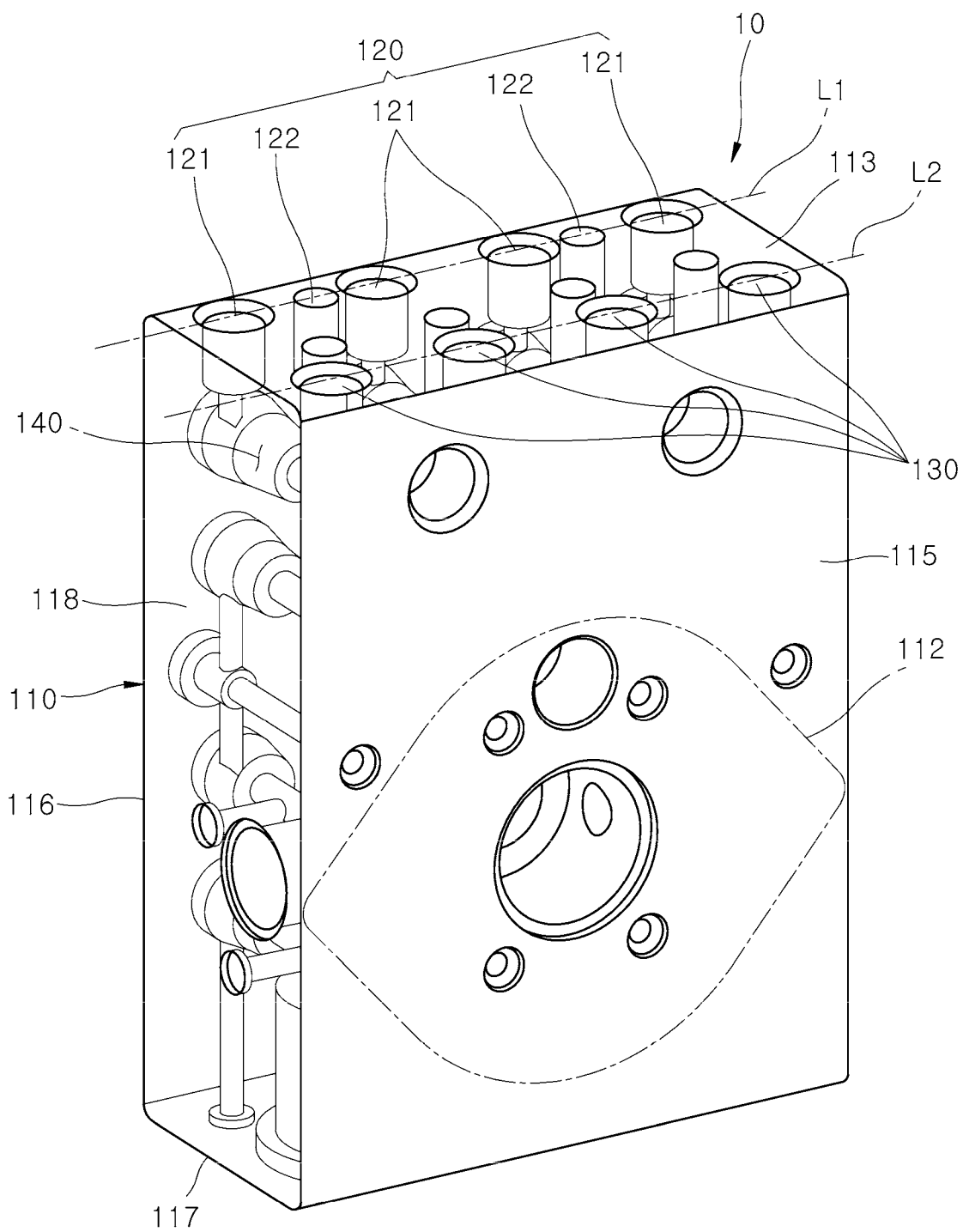
FIG. 3 is a perspective view schematically illustrating the hydraulic block of the electronic braking device for a vehicle in accordance with the embodiment of the present invention in a different direction from FIG. 2.
Figure 4:
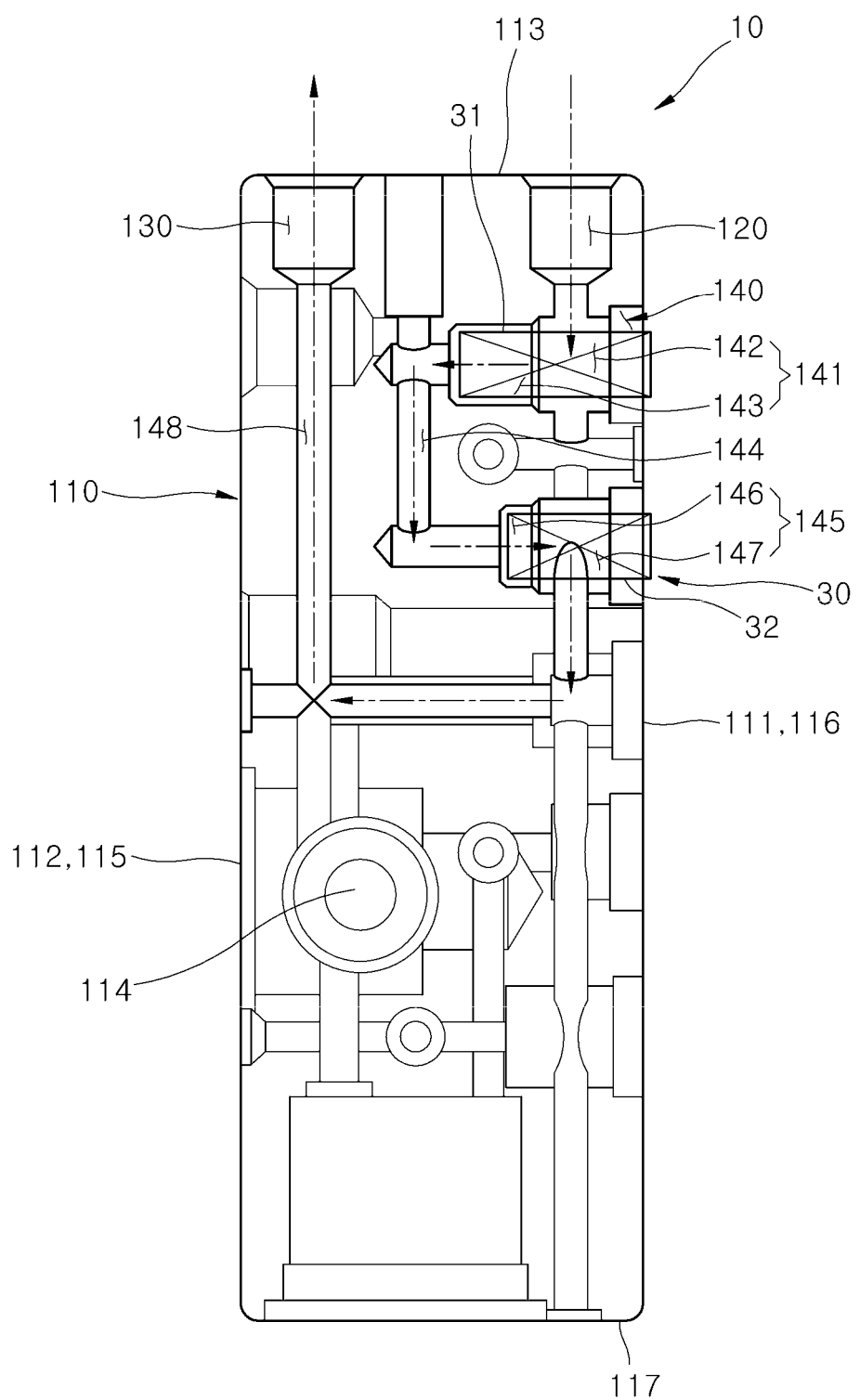
FIG. 4 is a cross-sectional view of main parts of the hydraulic block of the electronic braking device for a vehicle in accordance with the embodiment of the present invention.

FIG. 2 is a perspective view schematically illustrating the hydraulic block of the electronic braking device for a vehicle in accordance with the embodiment of the present invention, FIG. 3 is a perspective view schematically illustrating the hydraulic block of the electronic braking device for a vehicle in accordance with the embodiment of the present invention in a different direction from FIG. 2, and FIG. 4 is a cross-sectional view of main parts of the hydraulic block of the electronic braking device for a vehicle in accordance with the embodiment of the present invention.

Referring to FIGS. 2 and 3, the hydraulic block 10 of the electronic braking device in accordance with the embodiment of the present invention may include a block body 110, an input port part 120, an output port part 130 and a hydraulic circuit part (hydraulic circuit) 140.

The block body 110 may have a rectangular parallelepiped block shape of which the front surface 115 and the rear surface 116 have a larger area than other surfaces, and the top surface 113 and the bottom surface 117 have a smaller area than the front surface 115 and the rear surface 116, furthermore than side surfaces 118. The ECU 20 may be coupled to the rear surface 116 of the block body 110. In the present embodiment, the portion to which the ECU 20 is coupled may be referred to as a controller mounting part (controller mount) 111. The motor 40 may be coupled to the front surface 115 of the block body 110. In the present embodiment, the portion to which the motor 40 is coupled may be referred to as a motor mounting part (motor mount) 112.

The input port part 120 may be disposed closer to the controller mounting part 111 between the controller mounting part 111 and the motor mounting part 112, and connected to the output line 3 of the main braking device 2. The output port part 130 may be disposed closer to the motor mounting part 112 between the controller mounting part 111 and the motor mounting part 112, and connected to the hydraulic brake line 8 for individually adjusting the wheel 9.

A block-type hydraulic unit of the existing electronic braking device has a structure in which an inlet port for introducing fluid is disposed close to a motor member, and an outlet port for discharging fluid is disposed close to an electronic control member. Referring to FIG. 1 which schematically illustrates the main braking device 2 having the structure of the existing electronic braking device, the electronic control member is positioned on the rear surface of the hydraulic unit, the motor member is positioned on the front surface of the hydraulic unit, and the outlet port is positioned closer to the electronic control member than the motor member.

The hydraulic block 10 in accordance with the embodiment of the present invention may have a structure in which the input port part 120 is disposed close to the controller mounting part 111 and the output port part 130 is disposed close to the motor mounting part 112, on the contrary to the main braking device 2.

The main braking device 2 and the auxiliary braking device 6 may be arranged together in a limited space. The main braking device 2 and the auxiliary braking device 6 may be arranged in various manners depending on the specifications of vehicle parts, the shape of an arrangement space or a usage condition. For example, the main braking device 2 and the auxiliary braking device 6 may arranged in parallel to each other in the same direction as illustrated in FIG. 1, arranged facing each other, or arranged at a preset angle in the direction that they face each other, from the positions where they are arranged in parallel to each other in the same direction.

When the input port part 120 is disposed at the controller mounting part 111 as in the present embodiment, the input port part 120 may be positioned closer to the output line 3 of the main braking device 2 than the output port part 130 in the above-described arrangements. Therefore, the extension length of the output line 3 of the main braking device 2 can be minimized, which makes it possible to minimize a space required for installing and extending the plurality of output lines 3.

The input port part 120 may include a plurality of ports disposed on the top surface 113 of the block body 110 so as to form a first line 1L, the top surface 113 having a smaller area than the front surface 115 and the rear surface 116 of the block body 110. The input port part 120 in accordance with the embodiment of the present invention may include four main braking ports 121 and two master cylinder ports 122.

Each of the main braking ports 121 may be connected to the output line 3 (indicated by an alternated long and short dash line in FIG. 1) of the main braking device 2. The main braking device 2 may have four output lines 3 connected to the respective CBSs 7 for individually adjusting the four wheels 9, and the four main braking ports 121 corresponding to the four output lines 3, respectively, may be disposed separately from each other, while forming a line.

Each of the master cylinder ports 122 may be connected to the output line 5 (indicated by a dotted line in FIG. 1) of the master cylinder. In general, the master cylinder includes two output lines 5, and two master cylinder port parts 122 corresponding to the output lines 5 are installed. The master cylinder ports 122 may be disposed between the respective main braking port parts 121 so as to form one line.

When the master cylinder ports 122 are formed, fluid may be directly supplied from the master cylinder 4 through the output lines 5 of the master cylinder without passing through the main braking device 2, even though the fluid cannot smoothly pass through the main braking device 2 due to a breakdown of the main braking device 2. Thus, the same braking performance as the main braking device 2 can be achieved.

The output port part 130 may include a plurality of output ports which are disposed on the top surface 113 of the block body 110 in parallel to the input port part 120, while forming a second line L2. The output port part 130 may include four output ports corresponding to the hydraulic brake lines 8 connected to the respective CBSs 7 for individually adjusting the four wheels 9.

As described above, the input port part 120 and the output port part 130 may be disposed on the top surface 113 of the block body 110, while forming the plurality of lines. Thus, the plurality of output lines 3 of the main braking device 2 and the output lines 5 of the master cylinder, and the hydraulic brake lines 8, which correspond to the six input ports and the four output ports, can be efficiently disposed in a limited space corresponding to the top of the hydraulic block 10, and the interference of the output lines 3 of the main braking device 2 and the output lines 5 of the master cylinder with the hydraulic brake lines 8 can be minimized.

The hydraulic circuit part 140 may be formed in the block body 110 so as to extend from the input port part 120 to the output port part 130, and the valve 30 mounted in the ECU 20 may be included in the hydraulic circuit part 140. The valve 30 may include a first valve 31 and a second valve 32. Referring to FIG. 4, the hydraulic circuit part 140 in accordance with the embodiment of the present invention may include a first chamber 141, a chamber connection flow path 144, a second chamber 145 and an extended flow path 148.

The first chamber 141, which is a space for housing the first valve 31 inserted through the controller mounting part 111, may be formed so as to communicate with the bottom of the input port part 120. The first chamber 141 in accordance with the embodiment of the present invention may include a first input chamber 142 and a first output chamber 143, and the first valve 31 may be installed across the first input chamber 142 and the first output chamber 143.

The first input chamber 142 may be connected to the bottom of the input port part 120. Thus, fluid introduced downward through the input port part 120 may be continuously introduced into the first valve 31. The first output chamber 143 may be formed at one side of the first input chamber 142 so as to be connected to the first input chamber 142, and extended in a lateral direction away from the controller mounting part 111.

The chamber connection flow path 144, which serves as a flow path to connect the first and second chambers 141 and 145, may be extended in a U-shape, and have upper and lower ends connected to the first and second chambers 141 and 145, respectively. The fluid may be primarily controlled at a preset flow rate and hydraulic pressure while passing through the first valve 31. The flow direction of the fluid may be switched to the lateral direction away from the controller mounting part 111 while passing through the first output chamber 143, switched to the downward direction toward the second chamber 145 through the chamber connection flow path 144, and then switched to the lateral direction toward the controller mounting part 111.

The second chamber 145, which serves as a space for housing the second valve 32 inserted through the controller mounting part 111, may be formed so as to communicate with the bottom of the chamber connection flow path 144. The second chamber 145 in accordance with the embodiment of the present invention may include a second input chamber 146 and a second output chamber 147, and the second valve 32 may be installed across the second input chamber 146 and the second output chamber 147.

The second input chamber 146 may be connected to the bottom of the chamber connection flow path 144 so as to extend in the lateral direction. The fluid which is flowing in the lateral direction after reaching the bottom of the chamber connection flow path 144 may be introduced subsequently into the second valve 32. The second output chamber 147 may be formed at one side of the second input chamber 146 so as to be connected to the second input chamber 146.

The extended flow path 148, which serves as a flow path to connect the second chamber 145 to the output port part 130, may be extended upward from the bottom of the second output chamber 147 to the output port part 130. The flow direction of the fluid which has been secondarily controlled to a preset flow rate and hydraulic pressure while passing through the second valve 32 may be switched to the downward direction while the fluid passes through the second output chamber 147. Then, the fluid may flow upward toward the output port part 130 along the extended flow path 148.

The first valve 31 may perform a function of controlling whether to introduce fluid from the main braking device 2 or the master cylinder 4 and a function of primarily controlling hydraulic pressure to transfer fluid to the wheel 9 at preset pressure in a redundancy situation. The second valve 32 may perform a function of secondarily controlling hydraulic pressure to transfer fluid to the wheel 9 at preset pressure in the redundancy situation.

The hydraulic circuit part 140 in accordance with the embodiment of the present invention may include four hydraulic circuits corresponding to the four output ports, respectively, and four first valves 31 and four second valves 32 may be installed. The four first chambers 141 may be openly formed on the controller mounting part 111, and disposed over a pump housing bore 114 so as to form a third line L3 in a horizontal direction, and the four second chambers 145 may be disposed under the first chambers 141 or specifically between the first chambers 141 and the pump housing bore 114 so s to form a fourth line L4 in the horizontal direction.

As the first chamber 141 in which the first valve 31 is installed is connected to the input port part 120, the introduction of fluid from the main braking device 2 may be more rapidly and reliably controlled through the first valves 31. Furthermore, as the hydraulic circuit part 140 is switched a plurality of times in the lateral direction, the plurality of valves and hydraulic circuits may be efficiently disposed in the hydraulic block 10, while avoiding interference with other hollow portions formed in the hydraulic block 10, such as the pump housing bore 114, which makes it possible to reduce the size and weight of the hydraulic block 10.

In the hydraulic block 10 of the electronic braking device for a vehicle and the electronic braking device 1 for a vehicle having the same in accordance with the embodiment of the present invention, the input port part 120 may be formed at the controller mounting part 111, and the output port part 130 may be formed at the motor mounting part 112. Thus, when the hydraulic block 10 is applied as the auxiliary braking device 6 capable of performing a braking function in place of the main braking device 2 in case of a breakdown of the main braking device 2, the auxiliary braking device 6 and the main braking device 2 may be installed efficiently in terms of space.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A hydraulic block of an electronic braking device for a vehicle, comprising:
    a block body including a controller mount configured to couple an electronic control unit (ECU) and a motor mount configured to couple a motor;
    an input port part disposed closer to the controller mount between the controller mount and the motor mount;
    an output port part disposed closer to the motor mount between the controller mount and the motor mount; and
    a hydraulic circuit formed in the block body and configured to extend from the input port part to the output port part, and the hydraulic circuit including a valve configured to be controlled by the ECU,
    wherein the input port part comprises:
    a main braking port comprising a first main braking port and a second main braking port, each configured to be connected to an output line of a main braking device; and
    a master cylinder port configured to be connected to an output line of a master cylinder, and disposed between the first main braking port and the second main braking port.

2. The hydraulic block of claim 1, wherein the input port part is configured to be connected to an output line of a main braking device, and is disposed closer to the output line of the main braking device than the output port part, and
    the output port part is configured to be connected to a hydraulic brake line for individually adjusting a wheel.

3. The hydraulic block of claim 1, wherein the motor mount and the controller mount are disposed on a front surface and a rear surface of the block body, respectively, and
    the input port part is disposed on a top surface of the block body, which has a smaller area than the front and rear surfaces of the block body.

4. The hydraulic block of claim 3, wherein the input port part comprises a plurality of input ports arranged on the top surface of the block body while forming a first line, and the output port part comprises a plurality of output ports arranged on the top surface of the block body in parallel to the input port part, while forming a second line.

5. The hydraulic block of claim 1, wherein the hydraulic circuit comprises:
    a first chamber connected to the input port part, and housing a first valve inserted through the controller mount;
    a chamber connection flow path extending downward from the first chamber;
    a second chamber connected to the chamber connection flow path, and housing a second valve inserted through the controller mount; and
    an extended flow path extending upward from the second chamber to the output port part.

6. The hydraulic block of claim 5, wherein the first chamber comprises:
    a first input chamber connected to the bottom of the input port part so as to communicate with the input port part, such that fluid is introduced into the first valve; and
    a first output chamber connected to the first input chamber to switch a flow direction of the fluid to a lateral direction.

7. The hydraulic block of claim 5, wherein the second chamber comprises:
    a second input chamber connected to the bottom of the chamber connection flow path so as to be extended in a lateral direction, such that fluid is introduced into the second valve; and
    a second output chamber connected to the second input chamber to switch a flow direction of the fluid to a downward direction.

8. An electronic braking device for a vehicle, comprising:
    a main braking device configured to brake a vehicle using hydraulic pressure; and
    an auxiliary braking device configured for redundancy of vehicle braking, and including a hydraulic block having one side connected to an output line of the main braking device and the other side connected to a hydraulic brake line for individually adjusting a wheel,
    wherein the hydraulic block comprises:
    a block body including a controller mount configured to couple an ECU and a motor mount configured to couple a motor;
    an input port part disposed closer to the controller mount between the controller mount and the motor mount, and connected to the output line of the main braking device;
    an output port part disposed closer to the motor mount between the controller mount and the motor mount, and connected to the hydraulic brake line; and
    a hydraulic circuit formed in the block body so as to extend from the input port part to the output port part, and
    wherein the input port part comprises:
    a main braking port comprising a first main braking port and a second main braking port, each connected to the output line of the main braking device; and
    a master cylinder port connected to an output line of a master cylinder, and disposed between the first main braking port and the second main braking port.

9. The electronic braking device of claim 8, wherein the input port part is disposed closer to the output line of the main braking device than the output port part.

10. The electronic braking device of claim 8, wherein the motor mount and the controller mount are disposed on a front surface and a rear surface of the block body, respectively, and the input port part is disposed on a top surface of the block body, which has a smaller area than the front and rear surfaces of the block body.

11. The electronic braking device of claim 10, wherein the input port part comprises a plurality of input ports arranged on the top surface of the block body while forming a first line, and the output port part comprises a plurality of output ports arranged on the top surface of the block body in parallel to the input port part, while forming a second line.

12. The electronic braking device of claim 8, wherein the hydraulic circuit comprises:

a first chamber connected to the input port part, and housing a first valve inserted through the controller mount;

a chamber connection flow path extending downward from the first chamber;

a second chamber connected to the chamber connection flow path, and housing a second valve inserted through the controller mount; and an extended flow path extending upward from the second chamber to the output port part.

\* \* \* \* \*